Sept. 23, 1947.　　　　E. K. CLARK　　　　2,427,944

SWITCH FOR HEATING APPARATUS

Filed April 14, 1942　　　3 Sheets-Sheet 1

WITNESSES:

INVENTOR
EARL K. CLARK.
BY
ATTORNEY

Sept. 23, 1947.  E. K. CLARK  2,427,944
SWITCH FOR HEATING APPARATUS
Filed April 14, 1942   3 Sheets-Sheet 2

WITNESSES:

INVENTOR
EARL K. CLARK
BY
ATTORNEY

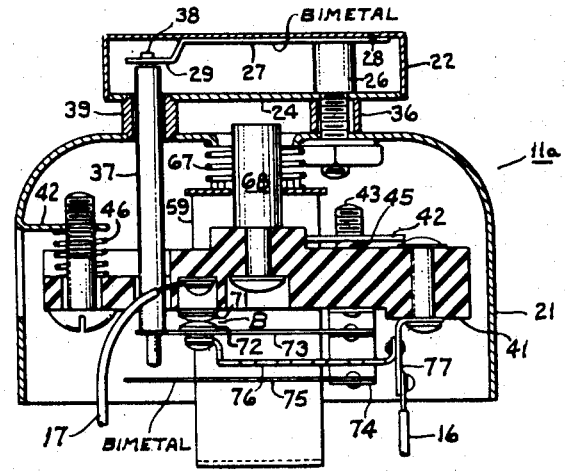

Patented Sept. 23, 1947

2,427,944

UNITED STATES PATENT OFFICE 2,427,944

SWITCH FOR HEATING APPARATUS

Earl K. Clark, Mansfield, Ohio, assignor to Westinghouse Electric Corporation, East Pittsburgh, Pa., a corporation of Pennsylvania Application April 14, 1942, Serial No. 438,887

2 Claims. (Cl. 200—138)

1

This invention relates to electric heating devices and particularly to electric cooking ranges and the like having a surface heating unit provided with a control for regulating the heat output of the unit, and it has for an object to provide an improved device of the character set forth.

In the art of cooking, it is desirable in cooking foods which require the addition of water to bring such foods and the water to the boiling point as rapidly as possible and then supply only sufficient heat to maintain the food and water at or near the boiling point so that the liquid will "simmer" until the food is completely cooked. In the copending application of Edward Bletz, filed on August 14, 1941, and bearing Serial No. 406,781, and assigned to the assignee of the present invention, there is described and claimed a control system for the surface units of electric cooking ranges or the like for automatically cooking foods in this manner.

Briefly, the Bletz application discloses a thermostat mounted in the center of a range surface unit in a position to engage and be responsive to the temperature of the vessel placed on the surface unit and an intermittently operating circuit-interrupting device remote from the surface unit and which is adjustable to vary the energy input to the surface unit. In the control system disclosed in the mentioned application, the thermostat maintains the surface unit on "high" heat or at maximum energy input until the vessel and its contents reach a predetermined temperature, such as the boiling point of water, after which the control of the heating element is cut back to the circuit-interrupting device which reduces the energy input to the surface unit to provide a predetermined amount of heat to the vessel sufficient to maintain it at the predetermined temperature.

It will be appreciated that it is not always possible to completely thermally insulate the thermostat from the heat of the range surface unit with the result that the thermostat is heated somewhat by the surface unit.

It is an object of the present invention to provide a thermostat which will accurately measure the temperature of a vessel even though mounted adjacent to the surface unit and not necessarily thermally insulated therefrom.

It is a further object of the invention to provide a thermostat construction of the character mentioned in which the switch thereof will not close or recycle, when once opened, during a continuous cooking operation.

2

These and other objects are effected by my invention as will be apparent from the following description and claim taken in connection with the accompanying drawings, forming a part of this application, in which:

Fig. 8 is a vertical section, corresponding to Fig. 4, of a modified form of the invention;

Fig. 9 is a schematic wiring diagram of one type of circuit in which the present invention may be employed;

Fig. 10 is a graph illustrating the time-temperature relation of a temperature-responsive element of the thermostat of the present invention and of different quantities of food cooked by a surface unit under the control of the present thermostat; and Fig. 11 is a sectional view of a modified switch structure forming a part of this invention.

Figure 1:
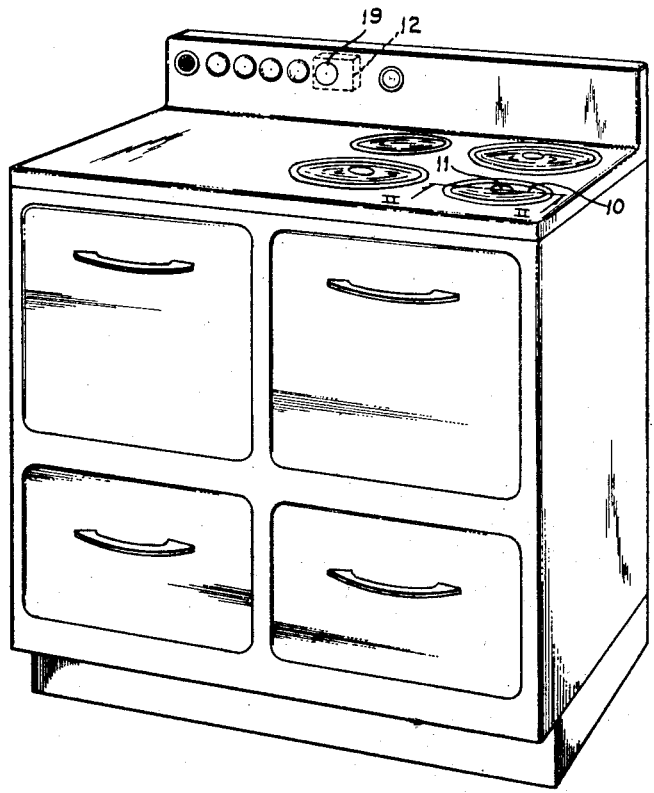
Fig. 1 is a perspective view of an electric cooking range in which the present invention has been incorporated.

Referring to the drawings and particularly to Fig. 9, there is shown a schematic wiring diagram of a control system for automatically controlling the operation of an electrical heating element such as a range surface unit of the range illustrated in Fig. 1. In this diagram a surface heating element 10, of the range of Fig. 1, is controlled by a thermostat 11 and a wattage regulator or the like, indicated diagrammatically by the rectangle 12. The thermostat 11 is adapted to be mounted in good heat-receiving relation to a kettle or the like placed on the surface unit 10 and operates a switch A. It will be understood that the thermostat 11 is adjusted to open this switch when the kettle reaches a predetermined temperature such as the boiling point of water. As long as the thermostat is below its switch-opening temperature, the heating element 10, in the circuit shown in Fig. 9, is continuously energized through a circuit traceable from one line conductor L1 through the heating element 10, conductors 15 and 16, closed contacts of the switch A, conductor 17, closed contacts of a line switch S to the other line conductor L2. When the thermostat reaches its switch-opening temperature, the mentioned circuit is interrupted and the wattage regulator 12, which has been shunted by the closed switch A, then completes a circuit for the surface unit 10. The wattage regulator may be of any preferred type such as a rheostat or intermittently-operating circuit interrupting means like that shown in the Bletz application, and is preferably adjustable to provide a predetermined energy input to the surface unit 10 when the switch A is open.

From this brief description, it will be seen that the heating element 10 is continuously energized until the switch A is opened, after which the energy input to the heating element 10 is reduced to complete the cooking of the food. Thus a quantity of food placed on the surface unit is rapidly raised to a predetermined temperature, by providing full energy input to the surface unit, and then the energy input is automatically reduced to complete the cooking operation.

The range shown in Fig. 1 may be of any desired construction and includes one or more surface units 10, each of which may be provided with a thermostat 11 and a wattage regulator 12 electrically connected in the manner shown in Fig. 9. The wattage regulator 12 may be mounted at the rear of the range backsplasher and adjusted by means of a knob 19 (Fig. 1).

In Figs. 2 to 7, inclusive, there is shown one embodiment of the thermostat 11. This thermostat comprises a lower switch casing 21 and an upper casing 22. The upper casing 22 is preferably of low mass and formed of good heat-conducting material and comprises an inverted cup-shaped member 23 the upper surface of which is preferably flat and supported, as will appear later, in a position to firmly engage the bottom of a kettle or the like placed on the surface unit 10. The bottom of this cup-shaped member is closed by means of a disc 24 which is secured thereto by means of shouldered studs 26 welded to the under surface of the top of the cup-shaped member.

Figure 3:
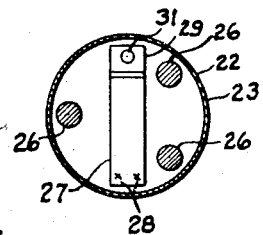
Fig. 3 is a horizontal section taken substantially on the line III—III of Fig. 2.
Figures 4, 5:
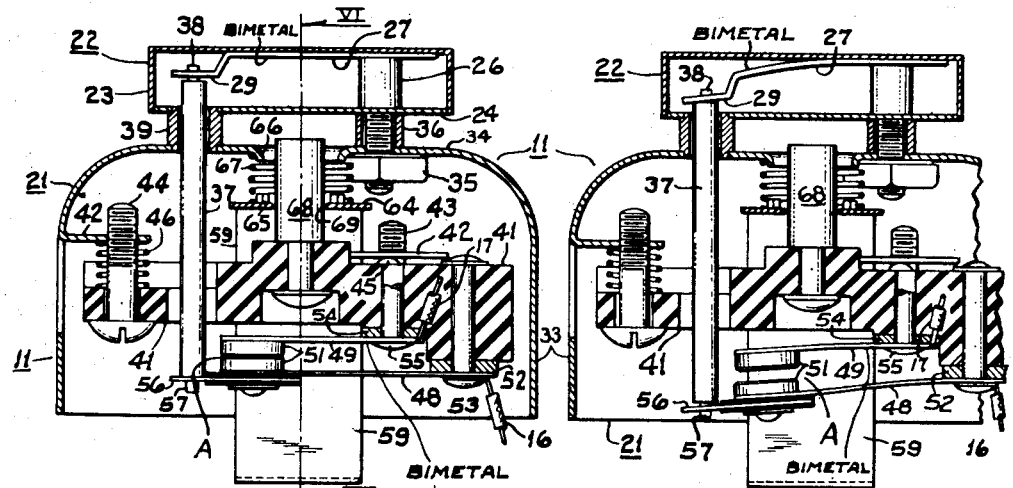
Fig. 4 is a vertical section taken substantially on the line IV—IV of Fig. 2 and showing the thermostat in its cold condition.
Fig. 5 is a view similar to Fig. 4 showing the thermostat in its hot or switch-opening condition.
Figure 6:
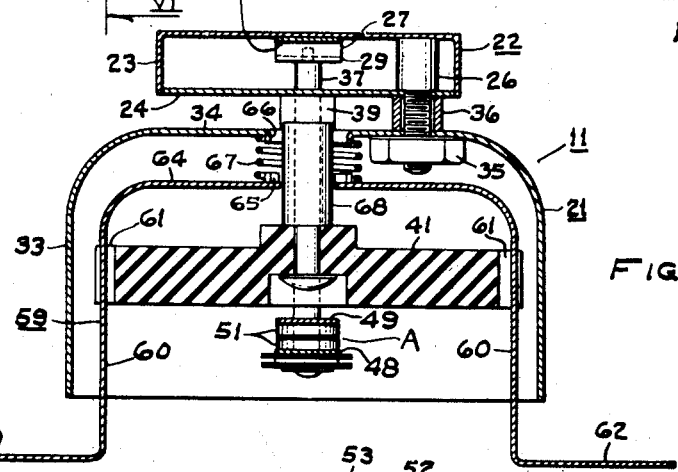
Fig. 6 is a vertical section taken substantially on the line VI—VI of Fig. 4.
Figure 7:
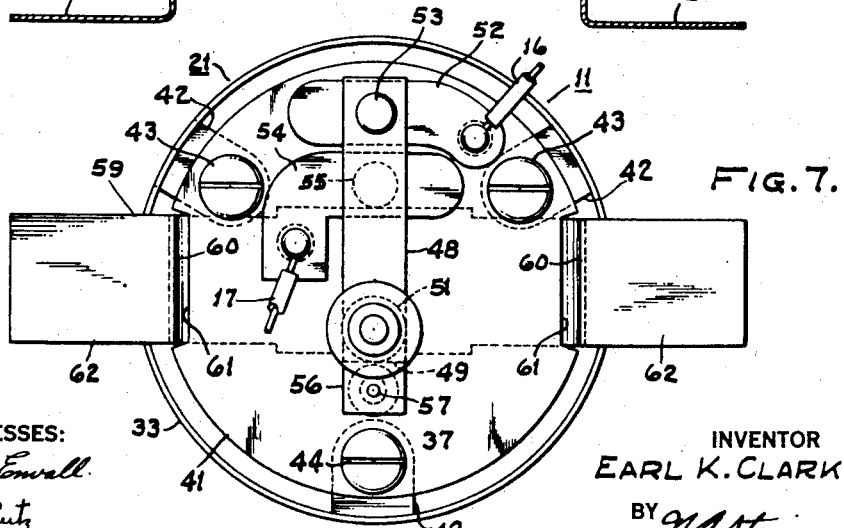
Fig. 7 is a bottom plan view of the thermostat of Fig. 6.

A primary bimetal strip 27 has one end thereof secured to the under surface of the top of the cup-shaped member as by spot welding, as indicated at 28 (Fig. 3). When the bimetal 27 is cold, that is, at room temperature, it engages, throughout a major portion of its length, the under surface of the cup-shaped member, as shown in Fig. 4. However, the free end of the bimetal is formed with a downwardly offset portion 29 which is provided with an aperture 31 (Fig. 3). The bimetal 27 is arranged with its active side uppermost, so that as it heats up the free end 29 bows downwardly, as shown in Fig. 5. To insure good transfer of heat from the kettle through the cup-shaped member to the bimetal, the bimetal may be given an initial curvature, with the concave side uppermost, and held flat against the cup-shaped member while securing it thereto. The initial curvature is such that the bimetal presses against the cup-shaped member during an initial portion of the heating up period of the bimetal.

The upper casing is free of all unnecessary thermal mass and is thermally isolated from the lower switch casing 21. These casings are thermally isolated from each other as much as possible to prevent the heat collected by the lower casing from being conducted to the primary bimetal 27, the function of which is to measure the temperature of the kettle on the surface unit. To further prevent conduction of heat from the lower casing to the upper casing, the undersurface of the disc 24 and the lateral walls of the upper casing may be reflecting surfaces to intercept and deflect back the heat radiated from the high temperature areas beneath and lateral of the upper casing.

The lower casing 21 is also preferably in the form of an inverted cup having side walls 33 and an integral top wall 34. The mentioned shouldered studs 26 carried by the upper casing extend through apertures in the top wall of the lower casing and receive nuts 35 engaging the under surface of this wall. Spacer sleeves 36, which may be of poor heat conducting material, are carried by these studs and disposed between the top of the lower casing and the closing disc 24 of the upper casing and serve to maintain the two casings in fixed spaced relation. From the construction described, it will be apparent that the two casings are definitely spaced apart providing an air space therebetween so that the heat of the lower casing cannot materially affect the temperature of the upper casing.

The switch A is supported within the lower casing 21 and is actuated by the primary bimetal strip 27 by means of a vertical rod 37. This rod is provided with a reduced upper end portion 38, which is loosely received in the aperture 31 in the free end of the primary bimetal strip. The rod extends downwardly through a bushing member 39 into the lower casing 21 and engages one arm of the switch A.

The switch A is mounted on the under surface of a block 41, of insulating material, supported within the lower casing by struck-in horizontal lugs 42 spaced about the side wall of the lower casing. Screws 43 and 44 inserted through suitable openings provided in this block and threaded into the lugs 42 adjustably support the block and the switch A carried thereby on the lugs.

In order to facilitate adjustment of the switch A relative to the primary bimetal strip in calibrating the thermostat, the upper surface of the block 41, at two of the mentioned screw-receiving openings, is provided with rounded bosses 45 which engage the under surface of their respective lugs 42 to provide fulcrum points. A compression spring 46 is interposed between the remaining lug 42 and the block 41 about the screw 44. When the switch structure has been mounted on the block, in a manner which will be clear from the description to follow, and with the bosses 45 drawn fairly snug against their respective lugs 42, the threaded screw 44 is turned to raise or lower the block about the mentioned bosses as fulcrum points to bring the switch into proper relation to the switch-operating rod 37 and the primary bimetal strip 27. When this adjustment has been made, a sealing compound or the like may be applied to each of the screws and the adjacent surface of the block 41 or the lugs 42 to fix them in their adjusted position and prevent them from being accidentally displaced.

The switch A comprises a pair of contact-carrying arms 48 and 49 mounted on the under side of the insulating block 41, and provided with opposed contacts 51 on the free ends thereof. The lower contact arm is made of spring metal and fixed to a terminal strap 52 (Fig. 7) which in turn is secured to a depending portion on the under surface of the block as by means of a rivet 53. When the thermostat is in its cold condition (Fig. 4), this spring arm, through its contact 51, exerts a pressure against the upper contact 51. The upper contact-carrying arm 49 is made of bimetal and has a terminal strap 54 (Fig. 7) fixed to the end opposite its contact 51. The terminal strap 54 is also secured to the under surface of the block 41 as by means of a rivet 55.

The free end of the lower spring arm 48 of the switch assembly is provided with an extension piece 56 insulatedly secured thereto. The outer end of this extension piece is provided with an opening substantially aligned with the opening 31 in the free end of the primary bimetal strip 27 and of a size to loosely receive the reduced lower end 57 of the switch operating rod 37.

As the primary bimetal element 27 heats up from its cold condition (Fig. 4) it bows downwardly, as shown in Fig. 5, and, acting through the rod 37 and extension piece 56, tends to separate the contacts 51. However, as shown in Fig. 5, the upper bimetal arm 49 as it heats up also bows down and tends to maintain the contacts 51 closed, as will appear later.

The top surface of the thermostat, when unrestrained, is disposed above the plane of the surface unit 10. The thermostat is resiliently mounted in the center of the surface unit so that it will yield under the weight of the kettle placed on the surface unit to maintain good thermal contact with the bottom of the kettle. To this end an inverted U-shaped bracket 59 is provided for supporting the thermostat in the position shown in Fig. 2. This bracket is disposed within the lower switch casing 21, the legs 60 thereof extending downwardly along the side wall of the switch casing 21 and received in clearance notches 61 formed in the block 41. As shown particularly in Figs. 2 and 6, the lower ends of this bracket are turned outwardly providing horizontal portions 62 which are secured to a U-shaped bracket 63 fixed to the supporting structure of the surface unit 10.

Figure 2:
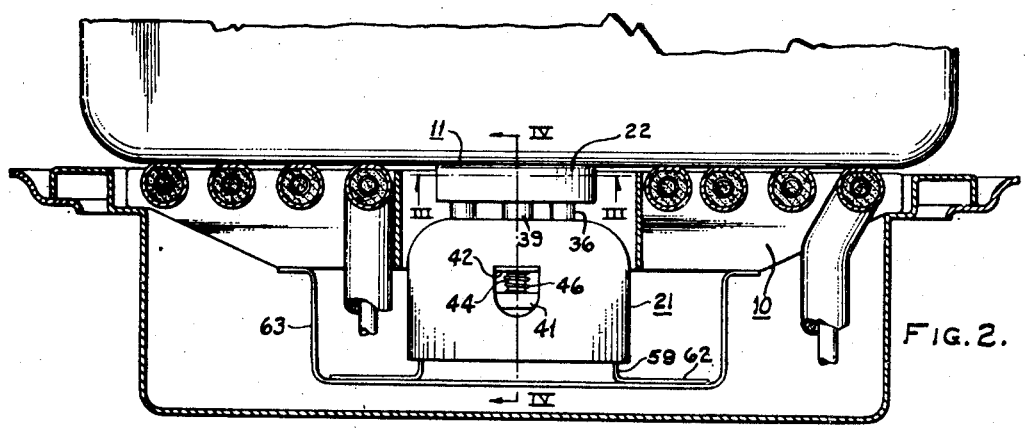
Fig. 2 is a vertical of one of the surface units of the range in Fig. 1, taken substantially on the line II—II of that figure, and showing a cooking vessel engaging the thermostat mounted in the center of the surface unit.

The upper horizontal portion 64 of the inverted U-shaped bracket 59 is provided with struck-up lugs 65 equally spaced about a common center, which lugs are in alignment with a downwardly-turned flange 66 provided centrally in the top wall of the lower casing 21. A compression spring 67 is disposed between the inverted U-shaped bracket 59 and the top wall of the switch casing and retained in position by means of the down-turned flange 66 and the upwardly-extending lugs 65, and tends to urge the thermostat structure upwardly away from the inverted U-shaped bracket 59 but permits the thermostat to be depressed, by a kettle as shown in Fig. 2, relative to the upper surface of the surface unit. If desired, a guide pin 68 may be fixed to the center of the block 41 and extend slidably through an opening 69 provided centrally of the upturned lugs of the U-shaped bracket to guide the thermostat in its up and down movement. The thermostat is free to rock or tilt on the bracket 59 so that it may adapt itself to irregularly-shaped bottoms of kettles.

When the operator desires to use the surface unit 10, she places the kettle containing the food to be cooked on the surface unit and manipulates the knob 19 to adjust the wattage regulator 12 to provide the correct amount of heat to the food when the same has been brought to a boil or preheated under the control of the thermostat 11. The kettle depresses the thermostat structure downwardly against the resistance offered by the spring 67 providing good thermal contact between the kettle and the upper casing of the thermostat 11.

Manipulation of the knob 19 also closes a line switch S (Fig. 9) as well understood in the art. Since the thermostat 11 is cold, the switch A is closed and, in the circuit shown in Fig. 9, shunts out the wattage regulator so that the surface unit is connected across the line conductors L1 and L2 to provide a maximum or high heat to the kettle.

As the temperature of the kettle rises, the primary bimetal strip 27 is heated thereby and exerts, through pin 37, a downward pressure on the spring arm 48 tending to move this arm in a direction away from the bimetal arm 49. If the contact-carrying arm 49 were not bimetal and subjected to the heat of the surface unit, the downward pressure exerted by the heated primary bimetal element would open the switch A when the downward pressure of the primary bimetal element exceeded the upward spring pressure of the spring arm 48. Thus, if the primary element 27 were completely thermally insulated from the heat of the surface unit so that it would be responsive only to the temperature of the kettle, it would be possible to calibrate the thermostat so that the downward pressure of the primary bimetal strip would exceed the upward pressure of the spring arm 48 when the temperature of the kettle reached the desired value. It will be appreciated that since the primary bimetal strip is not completely thermally insulated from the surface unit, it receives heat therefrom and consequently does not accurately measure the temperature of the kettle. However, the secondary bimetal strip 49, which is remote from the kettle and the upper casing and therefore receives substantially no heat therefrom, is influenced only by the heat of the surface unit 10 and therefore is calibrated or selected so that by moving in tandem with the primary bimetal strip 27, it compensates for the downward movement and pressure imparted to the primary bimetal strip by the heat this element receives from the surface unit.

Thus, both bimetal strips 27 and 49 bow downwardly as they heat up with the result that the switch contact carried by the secondary bimetal strip 49 tends to follow the switch contact carried by the spring arm 48, as the latter is moved by the operating pin 37 under the influence of the primary bimetal strip, and thereby retards the opening of the switch A.

Since the secondary bimetal strip 49 is selected to compensate for the downward pressure and movement imparted to the primary bimetal strip 27 by the heat it receives from the surface unit, the primary bimetal strip 27 can be arranged to open the switch A when the temperature of the kettle reaches the desired value.

When the switch A opens, the energization of the surface unit is controlled by the wattage regulator 12, which as mentioned above, is adjusted to supply a predetermined amount of heat to the kettle to maintain it at the proper temperature for completing cooking of the food.

In the graph of Fig. 10, the time-temperature relationship of the primary bimetal strip 27 while preheating one, two and three pints of water to the boiling point has been plotted, curves C, D, and E, respectively, together with a time-temperature curve H of the secondary bimetal strip 49, to show graphically the manner in which compensation is obtained for the heat leaking to the primary bimetal strip 27 from the surface unit. On the primary bimetal temperature curves C, D, and E, the points X, Y, and Z represent the temperatures attained by the primary bimetal strip when the several quantities of water, respectively, reach 212°. The points $T_1$, $T_2$, $T_3$ on the curve H respectively represent the temperature of the secondary bimetal strip at the time the primary bimetal strip attains the temperature represented by the points X, Y, and Z of the curves C, D, and E.

The compensation of the present thermostat, providing for automatic changes in the primary bimetal switch-opening temperature from point X to point Y to point Z is provided by the mechanism of temperatures $T_1$, $T_2$, and $T_3$ on the temperature curve H of the secondary compensating bimetal 49. For example, the change in temperature of the secondary bimetal strip from $T_1$ to $T_2$ when preheating two pints of water provides sufficient downward movement of the bimetal strip 49 to raise the switch-opening temperature of the primary bimetal from X to Y. Similarly the change in temperature of the secondary bimetal strip from $T_2$ to $T_3$ when preheating three pints of water further increases the bowing of the secondary bimetal strip to raise the switch-opening temperature of the primary bimetal from Y to Z.

It is to be understood that the graph of Fig. 10 is merely illustrative and that the shape of the curves C, D, E, and H may vary depending upon the size and type of surface unit and the characteristics of the thermostat.

In order to prevent recycling of the thermostat during a continuous cooking operation, that is, to maintain the switch A open once it has been opened by the heat of the kettle, the secondary bimetal strip 49 serves as a conductor in the circuit controlled by the switch A so that as long as the switch A is closed the resistance of the bimetal conductor will cause it to be heated thereby.

When the switch A opens, this added heat is removed and the secondary bimetal element immediately cools slightly. On cooling, the secondary bimetal flexes upwardly away from the spring arm 48 thereby increasing the gap between the contacts 50. From this it will be seen that the switch-closing temperature of the primary bimetal element 27 will be lower than its switch-opening temperature and normally prevent recycling of the thermostat during a cooking operation. In the graph of Fig. 10, the actual temperature of the secondary bimetal strip 49 is represented by the dotted line $H_1$, the differential between this line and the line H representing the heat generated within the bimetal strip by its resistance to the flow of electricity therethrough.

In Fig. 8 there is illustrated a slightly modified form of the invention in which compensation for the heat leaking to the primary bimetal element 27 from the surface unit is obtained in a slightly different manner from that explained above. In this modified form of the invention, the construction of the upper casing and the mounting of the switch block in the lower casing, as well as the manner of supporting the thermostat in the surface unit may be identical with preferred form of the invention described above and the parts thereof have been identified by the same reference characters.

The modified thermostat, generally indicated 11a, like the thermostat 11 is compensated to correct for the leakage of heat to the primary bimetal element from the surface unit and is also designed to prevent recycling of its switch B which corresponds to the switch A of thermostat 11.

The switch B comprises a contact 71, connected to conductor 17 of the circuit of Fig. 9, and fixed to the under side of the block 41 in alignment with a cooperating contact 72 insulatedly mounted on the free end of an upwardly biased spring arm 73. The spring arm 73 is fixed at its opposite end to a bracket 74 secured to the underside of the block 41.

The portion of the free end of the spring arm 73 which extends beyond the contact 72 is provided with an aperture of a size to loosely receive the reduced lower end of the switch-operating rod 37. As the primary bimetal strip 27 heats up, it exerts a downward pressure on the spring arm 73 and tends to move the contact 72 clear of the fixed contact 71.

In order to compensate for the leakage of heat to the primary bimetal strip 27 from the surface unit, a compensating bimetal strip 75 is arranged so that its free end lies in the path of movement of the switch-operating rod 37. This compensating bimetal strip is mounted on a portion of the spring arm supporting bracket 74 and is arranged so that it bows upwardly when heated and engages the lower end of the operating rod 37, to resist the downward pressure and movement imparted to this rod by the primary bimetal strip. As in the case of the compensating bimetal strip 49 of the thermostat 11, the compensating bimetal strip 75 is substantially thermally isolated from the heat of the kettle and of the primary bimetal casing 22 but is heated by and measures the heat of the surface unit 18. The compensating bimetal 75 is selected so that the pressure which it exerts against the switch-operating rod compensates or corrects for the increase in downward pressure of the primary bimetal element resulting from the heat leaking to the primary bimetal element from the surface unit. The graph of Fig. 10 applies to the thermostat 11a as well as to the thermostat 11.

In order to prevent recycling of the thermostat 11a, that is, to prevent the switch B from closing, when once opened, during a continuous cooking operation, additional heat is supplied to the compensating bimetal element 75 as long as the switch B is closed so that switch B closes at a lower temperature of the primary bimetal element than that at which it opens. This added heat is supplied by means of a small heater 76 supported adjacent the compensating bimetal strip 75 by means of a terminal bracket 77 fixed to one end of the heater the other end of the heater being connected to the switch contact 72.

The conductor 16 of the circuit of Fig. 9 is connected to the terminal bracket 77 so that the heating element 76 is in the circuit controlled by the switch B. As long as the switch B remains closed the heater is energized and supplies heat to the compensating bimetal strip. However, when the switch B opens, the heater is deenergized with the result that the compensating bimetal strip 73 immediately cools slightly and in so doing moves in a direction away from the switch-operating pin 37 to reduce the upward pressure it exerts on this pin.

It will be appreciated that substantial cooling of the primary bimetal strip from its switch-opening temperature will be required before the switch B can again close and that by providing this differential between the switch-opening temperature and the switch-closing temperature of the primary bimetal element substantially prevents recycling of the switch during a continuous cooking operation.

In Fig. 11 there is shown a slightly modified form of the switch A of the thermostat 11. In this modified switch the upper contact 51 carried by the bimetal element 49 is replaced by a contact having a metallic head 79 and an elongated, slender metallic shank 80 which is fixed to the bimetal element. The head 79 is spaced from the bimetal element by means of a sleeve 81, of poor heat conducting material. This construction tends to prevent the $I^2R$ heat loss of the switch contacts from being conducted to the bimetal element 49. Other arrangements for retarding or preventing the flow of heat from the switch contacts to the bimetal element 49 will occur to those skilled in the art, the illustration in Fig. 11 being given by way of example only.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. A thermostat comprising casing means having first and second compartments thermally isolated from each other, a primary temperature-responsive element mounted within said first compartment, a switch mounted within said second compartment and including a pair of arms having opposed switch contacts thereon, one of said arms being resilient, and a member engaged at one end by said primary temperature-responsive element and at its other end by said resilient arm and operable to move said resilient arm in contact-opening direction upon increase in temperature imposed on said primary temperature-responsive element, the other arm being temperature-responsive and operable to move its contact in contact-closing direction upon increase in temperature, in order to compensate for any heat that may be supplied to said primary temperature-responsive element by a source which also heats said temperature-responsive switch arm.

2. A thermostat as set forth in claim 1 and further including means for applying heat to said temperature-responsive arm in response to flow of electric current through said contacts when engaged, whereby when said switch opens the reclosing temperature of the thermostat is lowered.

EARL K. CLARK.

REFERENCES CITED

The following references are of record in the file of this patent:

UNITED STATES PATENTS

| Number | Name | Date |
| --- | --- | --- |
| 2,140,479 | Myers | Dec. 13, 1938 |
| 2,153,503 | Reingruber | Apr. 4, 1939 |
| 1,993,956 | Browning | Mar. 12, 1935 |
| 2,182,048 | Elmer | Dec. 5, 1939 |
| 2,207,871 | Myers | July 16, 1940 |
| 1,880,743 | Botts | Oct. 4, 1932 |
| 1,927,934 | Ford | Sept. 26, 1933 |
| 2,044,397 | Persons | June 16, 1936 |
| 2,387,460 | Myers | Oct. 23, 1945 |

Certificate of Correction

Patent No. 2,427,944.  September 23, 1947.

EARL K. CLARK

It is hereby certified that errors appear in the printed specification of the above numbered patent requiring correction as follows: Column 2, line 9, after "vertical" insert *section*; column 4, line 70, for "surlace" read *surface*; and that the said Letters Patent should be read with these corrections therein that the same may conform to the record of the case in the Patent Office.

Signed and sealed this 25th day of November, A. D. 1947.

[SEAL]

THOMAS F. MURPHY,
*Assistant Commissioner of Patents.*